(12) United States Patent
Wei

(10) Patent No.: US 11,314,117 B2
(45) Date of Patent: Apr. 26, 2022

(54) DISPLAY ASSEMBLY, DISPLAY DEVICE AND CONTROL METHOD THEREOF

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 244 days.

(21) Appl. No.: 16/606,163

(22) PCT Filed: Apr. 15, 2019

(86) PCT No.: PCT/CN2019/082694
§ 371 (c)(1),
(2) Date: Oct. 17, 2019

(87) PCT Pub. No.: WO2019/218825
PCT Pub. Date: Nov. 21, 2019

(65) Prior Publication Data
US 2021/0333581 A1    Oct. 28, 2021

(30) Foreign Application Priority Data
May 17, 2018   (CN) .......................... 201810476877.6

(51) Int. Cl.
*G02F 1/1334*   (2006.01)
*G02B 30/27*   (2020.01)
(Continued)

(52) U.S. Cl.
CPC ......... *G02F 1/1334* (2013.01); *G02B 6/0046* (2013.01); *G02B 30/27* (2020.01);
(Continued)

(58) Field of Classification Search
None
See application file for complete search history.

(56) References Cited

U.S. PATENT DOCUMENTS 7,436,594 B2   10/2008   Van Berkel et al.
8,035,762 B2   10/2011   Ijzerman et al.
(Continued)

FOREIGN PATENT DOCUMENTS

CN   1423152 A   6/2003
CN   1833450 A   9/2006
(Continued)

OTHER PUBLICATIONS

Second Chinese Office Action dated Sep. 7, 2020, received for corresponding Chinese Application No. 201810476877.6, 25 pages.
(Continued)

*Primary Examiner* — James A Dudek
(74) *Attorney, Agent, or Firm* — Kinney & Lange, P.A.

(57) ABSTRACT

A display assembly, a display device, and a control method thereof are disclosed. The display assembly includes: a polymer dispersed liquid crystal layer; a first electrode layer and a second electrode layer for providing an electric field for the polymer dispersed liquid crystal layer; and a birefringent lens grating that is closer to a display side of the display assembly than the polymer dispersed liquid crystal layer. The birefringent lens grating is configured to transmit collimated light of a first polarization direction emitted from the polymer dispersed liquid crystal layer along an original optical path of the collimated light, and to refract collimated light of a second polarization direction emitted from the polymer dispersed liquid crystal layer to left and right eyes of an user, respectively. The first polarization direction is perpendicular to the second polarization direction.

19 Claims, 5 Drawing Sheets

(51) Int. Cl.
    *G02F 1/1335*     (2006.01)
    *F21V 8/00*     (2006.01)
    *G02F 1/13357*     (2006.01)
    *G02F 1/13363*     (2006.01)
    *G02F 1/1343*     (2006.01)

(52) U.S. Cl.
    CPC .... *G02F 1/13363* (2013.01); *G02F 1/133526* (2013.01); *G02F 1/133531* (2021.01); *G02F 1/133605* (2013.01); *G02F 1/134336* (2013.01)

(56) References Cited

U.S. PATENT DOCUMENTS

| | | | |
|---|---|---|---|
| 8,310,621 | B2 | 11/2012 | Fujii et al. |
| 9,696,556 | B2 | 7/2017 | Lin |
| 10,515,597 | B2 | 12/2019 | Cui et al. |
| 2003/0142057 | A1 | 7/2003 | Niiyama et al. |
| 2011/0254834 | A1* | 10/2011 | Jeon ............ G02B 30/25 345/419 |
| 2012/0092589 | A1 | 4/2012 | Ma |
| 2012/0208637 | A1* | 8/2012 | Hirakata ........... H04N 13/315 463/31 |
| 2012/0242927 | A1 | 9/2012 | Kim et al. |
| 2016/0161823 | A1 | 6/2016 | Kim et al. |

FOREIGN PATENT DOCUMENTS

| | | |
|---|---|---|
| CN | 1890988 A | 1/2007 |
| CN | 101246262 A | 8/2008 |
| CN | 101387758 A | 3/2009 |
| CN | 101946205 A | 1/2011 |
| CN | 102454915 A | 5/2012 |
| CN | 202548484 U | 11/2012 |
| CN | 103412434 A | 11/2013 |
| CN | 104062765 A | 9/2014 |
| CN | 105869036 A | 8/2016 |
| CN | 206096697 U | 4/2017 |
| CN | 107633822 A | 1/2018 |
| CN | 108490670 A | 9/2018 |

OTHER PUBLICATIONS

Hongjin Gao and Youmei Dong, New Display Technology (book), pp. 162-163, vol. 2, Beijing University of Posts and Telecommunications Press (2014).

First Chinese Office Action dated Feb. 27, 2020, received for corresponding Chinese Application No. 201810476877.6, 19 pages.

* cited by examiner

DISPLAY ASSEMBLY, DISPLAY DEVICE AND CONTROL METHOD THEREOF

CROSS-REFERENCE TO RELATED APPLICATION(S)

This application is a Section 371 National Stage Application of International Application No. PCT/CN2019/082694, filed on Apr. 15, 2019, entitled "DISPLAY COMPONENT, DISPLAY DEVICE AND CONTROL METHOD THEREOF", which claims priority to Chinese Patent Application No. 201810476877.6 filed on May 17, 2018 with CNIPA, incorporated herein by reference in its entirety.

TECHNICAL FIELD

Embodiments of the present disclosure relate to the field of display technology, and in particular, to a display assembly, a display device, and a control method thereof.

BACKGROUND

With the development of display technology, active research has been conducted on transparent display devices capable of realizing image display on a display panel and making objects located at the back side of the display panel visible. Such transparent display devices can be applied to a vehicle windshield, a residential glass, a display window glass, a building curtain wall, and the like, to provide information required by users. Therefore, such transparent display devices have become a hot spot of current research.

PDLC (Polymer Dispersed Liquid Crystal) refers to a substance made by mixing low molecular liquid crystal (LC) with a prepolymer, allowing them to undergo a polymerization reaction under certain conditions to form micron-sized liquid crystal droplets uniformly dispersed in a polymer network. PDLC is a material having electro-optical response characteristics by means of dielectric anisotropy of the liquid crystal molecules, and it mainly works between a scattering state and a transparent state and has a certain gray scale. The liquid crystal molecules impart significant electro-optical characteristics to the polymer dispersed liquid crystal layer, and therefore PDLC has attracted extensive attention and has broad application prospects. Compared with the conventional display device, the liquid crystal display having the polymer dispersed liquid crystal layer has many advantages, for example, there are no needs for a polarizer and an alignment layer, the preparation process is simple, and it is easy to manufacture a large-area flexible display, and the like, and therefore it has been widely applied.

With the development of display technology, stereoscopic display has been favored by consumers. It is expected that the liquid crystal display having the polymer dispersed liquid crystal layer has both a stereoscopic display function and a 2D (2 Dimension) display function.

SUMMARY

According to a first aspect of the present disclosure, there is provided a display assembly, comprising:
a polymer dispersed liquid crystal layer;
a first electrode layer and a second electrode layer for providing an electric field for the polymer dispersed liquid crystal layer; and
a birefringent lens grating that is closer to a display side of the display assembly than the polymer dispersed liquid crystal layer,
wherein the birefringent lens grating is configured to transmit collimated light of a first polarization direction emitted from the polymer dispersed liquid crystal layer along an original optical path of the collimated light, and to refract collimated light of a second polarization direction emitted from the polymer dispersed liquid crystal layer to left and right eyes of an user, respectively; and
wherein the first polarization direction is perpendicular to the second polarization direction.

In some embodiments of the present disclosure, the display assembly comprises a plurality of pixel regions, the plurality of pixel regions being divided into left eye pixel regions and right eye pixel regions; and
wherein the birefringent lens grating is configured to refract collimated light of the second polarization direction emitted from each of the left eye pixel regions to a left eye field of view, and to refract collimated light of the second polarization direction emitted from each of the right eye pixel regions to a right eye field of view.

In some embodiments of the present disclosure, in a row direction or a column direction, the pixel region adjacent to one left eye pixel region is a right eye pixel region, and the pixel region adjacent to one right eye pixel region is a left eye pixel region.

In some embodiments of the present disclosure, a projection of the first electrode layer on the polymer dispersed liquid crystal layer and a projection of the second electrode layer on the polymer dispersed liquid crystal layer overlap to form a plurality of overlapping regions, the plurality of overlapping regions being in one-to-one correspondence with the plurality of pixel regions.

In some embodiments of the present disclosure, the first electrode layer is disposed on a side of the polymer dispersed liquid crystal layer away from the birefringent lens grating; and
wherein the second electrode layer is disposed on a side of the birefringent lens grating away from the polymer dispersed liquid crystal layer or between the polymer dispersed liquid crystal layer and the birefringent lens grating.

In some embodiments of the present disclosure, the display assembly further comprises a transparent intermediate layer disposed between the polymer dispersed liquid crystal layer and the birefringent lens grating.

In some embodiments of the present disclosure, the birefringent lens grating is a cylindrical lens concave grating.

In some embodiments of the present disclosure, the cylindrical lens concave grating has a grating pitch corresponding to a width of two pixel regions.

In some embodiments of the present disclosure, the first electrode layer comprises a plurality of block electrodes arranged in a matrix, and the second electrode layer is of a planar electrode; or
wherein the first electrode layer is of a planar electrode, and the second electrode layer comprises a plurality of block electrodes arranged in a matrix.

According to a second aspect of the present disclosure, there is provided a display device, comprising:
the display assembly according to any one of the above embodiments; and
a backlight module,
wherein the backlight module is configured to provide the collimated light of the first polarization direction and the collimated light of the second polarization direction to the display assembly.

In some embodiments of the present disclosure, the backlight module comprises a light source, a polarization controller disposed on a light exit side of the light source, and a light guide plate;

the polarization controller is configured to make light emitted into the light guide plate be light of the first polarization direction or light of the second polarization direction;

the light guide plate is configured to allow the light of the first polarization direction and the light of the second polarization direction to be emitted perpendicularly into the display assembly.

In some embodiments of the present disclosure, the light guide plate is a wedge-shaped body and comprises a light incident surface opposite to the light source, a light exit surface parallel to the display assembly, and a reflective surface intersecting with the light incident surface and the light exit surface.

In some embodiments of the present disclosure, the backlight module further comprises a support plate, the support plate being a wedge-shaped body having a same shape as the light guide plate, a slope surface of the light guide plate and a slope surface of the support plate contact with each other to form a cuboid.

In some embodiments of the present disclosure, the light guide plate has an included angle between the reflective surface of the light guide plate and the light exit surface of the light guide plate that is equal to 45°.

In some embodiments of the present disclosure, the backlight module further comprises at least one transparent reflection-enhanced layer disposed between the slope surface of the light guide plate and the slope surface of the support plate, the transparent reflection-enhanced layer is configured to reflect the light of the first polarization direction and the light of the second polarization direction, and to transmit light that is emitted from the support plate to the transparent reflection-enhanced layer.

In some embodiments of the present disclosure, the polarization controller comprises: a liquid crystal layer; a polarizer disposed on a side of the liquid crystal layer adjacent to the light source; and a third electrode layer and a fourth electrode layer for providing an electric field to the liquid crystal layer.

In some embodiments of the present disclosure, the third electrode layer comprises a plurality of first sub-electrodes spaced apart in a first direction, the fourth electrode layer comprises a plurality of second sub-electrodes spaced apart in a second direction, the second direction intersecting with the first direction;

or, wherein the third electrode layer comprises a plurality of first sub-electrodes arranged in a matrix, and the fourth electrode layer is of a planar electrode.

In some embodiments of the present disclosure, the light source is configured to periodically emit a plurality of monochromatic lights in a predetermined sequence.

According to a third aspect of the present disclosure, there is provided a control method of the display device according to any one of the above embodiments, comprising:

controlling the backlight module to provide the collimated light of the first polarization direction and/or the collimated light of the second polarization direction to the display assembly; and applying a voltage to the first electrode layer and the second electrode layer according to an image to be displayed such that sub-pixels in the polymer dispersed liquid crystal layer that do not correspond to the image to be displayed are in a transparent state.

BRIEF DESCRIPTION OF THE DRAWINGS

In order to more clearly illustrate the embodiments of the present disclosure or the technical solutions in the prior art, the drawings to be used in the description of the embodiments or the prior art will be briefly described below. Obviously, the drawings referred to in the following description only represent some embodiments of the present disclosure, and other drawings may be obtained by those skilled in the art based on these drawings without any creative efforts.

DETAILED DESCRIPTION OF EMBODIMENTS

The technical solutions in the embodiments of the present disclosure will be clearly and completely described below with reference to the accompanying drawings in the embodiments of the present disclosure. It is obvious that the described embodiments are only a part of the embodiments of the present disclosure, but not all of the embodiments. All other embodiments obtained by those skilled in the art based on the embodiments of the present disclosure without any creative efforts fall within the scope of the present disclosure.

With the development of display technology, stereoscopic display has been favored by consumers. The conventional liquid crystal display having a polymer dispersed liquid crystal layer cannot realize stereoscopic display, therefore it cannot achieve both a stereoscopic display function and a 2D (2 Dimension) display function.

Embodiments of the present disclosure provide a display assembly, a display device, and a control method thereof, which enable the liquid crystal display having a polymer dispersed liquid crystal layer to have both a stereoscopic display function and a 2D display function.

Figure 1:
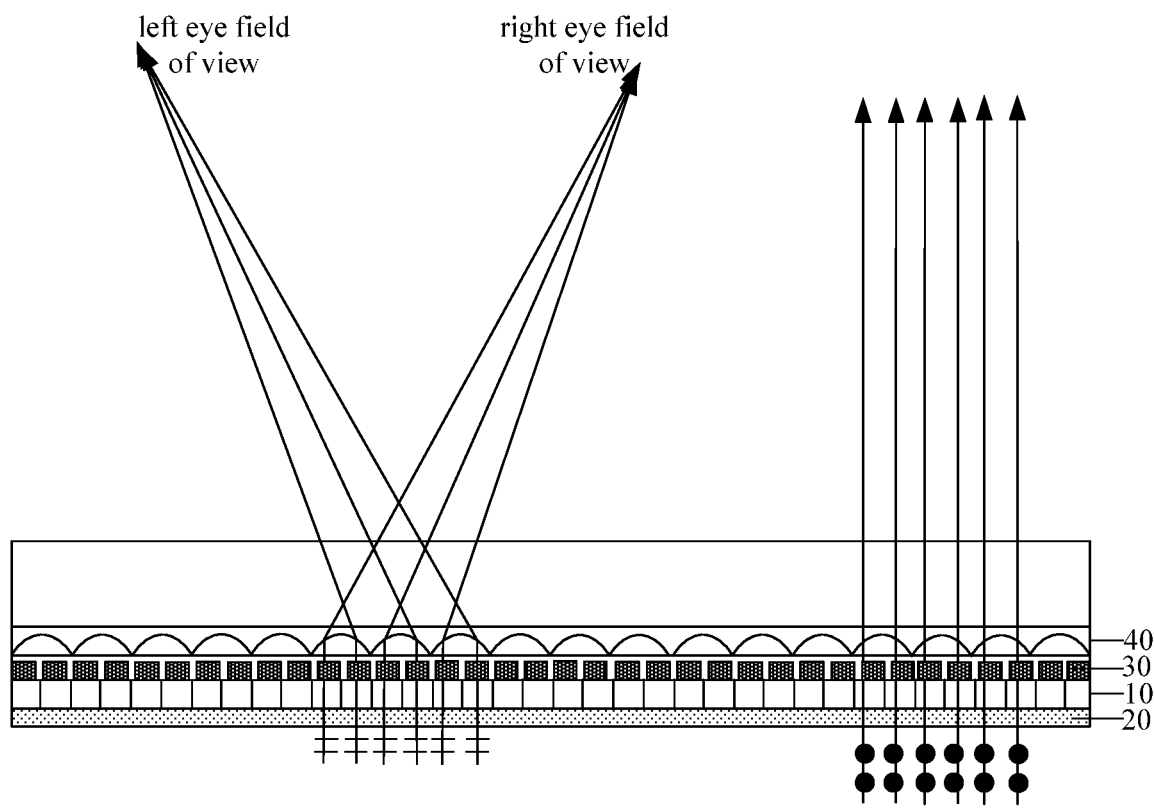
FIG. 1 is a schematic structural view of a display assembly according to an embodiment of the present disclosure.
Figure 2:
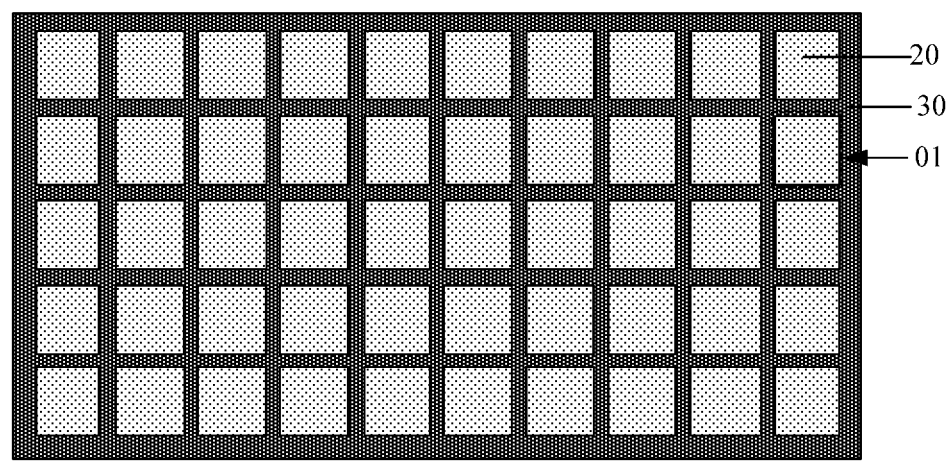
FIG. 2 is a schematic structural view of a first electrode layer and a second electrode layer according to an embodiment of the present disclosure.

In an embodiment of the present disclosure, it provides a display assembly, as shown in FIG. 1, comprising a polymer dispersed liquid crystal layer 10, a first electrode layer 20 and a second electrode layer 30 for providing an electric field for the polymer dispersed liquid crystal layer 10, a birefringent lens grating 40 disposed on a side of the polymer dispersed liquid crystal layer 10 close to a display side of the display assembly. In a thickness direction of the polymer dispersed liquid crystal layer, as shown in FIG. 2, the first electrode layer 20 and the second electrode layer 30 overlap to form a plurality of pixel regions 01. The birefringent lens grating 40 is configured to transmit collimated light of a first polarization direction (perpendicular to the paper surface, for example, dots shown in FIG. 1) emitted from each of the pixel regions 01 along an original optical path of the collimated light, and to refract collimated light of a second polarization direction (perpendicular to the propagation direction, for example, short lines shown in FIG. 1) emitted from each of the pixel regions 01 to a field of view corresponding to the pixel region 01; the first polarization direction is perpendicular to the second polarization direction.

It should be noted that, firstly, the polymer dispersed liquid crystal layer 10 refers to a film layer formed of Polymer Dispersed Liquid Crystal (PDLC), and the polymer dispersed liquid crystal layer 10 is kept in a transparent state under the driving of the voltage between the first electrode layer 20 and the second electrode layer 30, and it is kept in a scattering state when deenergized.

Herein, the polymer dispersed liquid crystal layer 10 does not change the polarization state of the incident light.

Secondly, the structures of the first electrode layer 20 and the second electrode layer 30 may be designed as shown in FIG. 2, as long as they may independently control each pixel region 01 of the polymer dispersed liquid crystal layer 10. Herein, the arrangement position of the first electrode layer 20 and the second electrode layer 30 is not limited, as long as the polymer dispersed liquid crystal layer 10 may be point-controlled. For example, the first electrode layer 20 includes block electrodes arranged in a matrix and the second electrode layer 30 is of a planar electrode, or alternatively the first electrode layer 20 is of a planar electrode, and the second electrode layer 30 includes block electrodes arranged in a matrix. Apparently, the first electrode layer 20 and the second electrode layer 30 may have other shapes and arrangements.

Each overlapping region of the first electrode layer 20 and the second electrode layer 30 corresponds to one pixel region 01.

Of course, it should be appreciated by those skilled in the art that the first electrode layer 20, the second electrode layer 30 and an intermediate layer 50 of the display assembly herein should be made from transparent materials, in order for transparent display.

Thirdly, the display side of the display assembly is the viewing side for the user.

Fourthly, the birefringent lens grating 40 may be obtained by filling a curing-type liquid crystal material on a substrate provided with a cylindrical lens concave grating, and aligning and curing it, the cylindrical lens concave grating may be obtained by using a mold. The working principle of the birefringent lens grating 40 refers to: for optically positive liquid crystal, the extraordinary refractive index $n_e$ of the liquid crystal is greater than the ordinary refractive index $n_o$ thereof, the cylindrical lens concave grating is of a single refractive material having a refractive index of $n_p$, which is equal to $n_o$; if the polarization direction of the incident polarized light coincides with the long-axis direction of the liquid crystal molecules of the liquid crystal material in the birefringent lens grating 40, the liquid crystal molecules in the birefringent lens grating 40 would exhibit a long-axis refractive index; because of $n_e > n_p$, linearly polarized light is refracted at the boundary between the liquid crystal material and the cylindrical lens concave grating, so that the light from different pixel regions 01 is refracted into a different field of view corresponding to the pixel region 01 in question, thereby realizing stereoscopic display; if the polarization direction of the incident polarized light is rotated by 90°, when the light is incident into the birefringent lens grating 40, the polarization direction of the linearly polarized light coincides with the short-axis direction of the liquid crystal molecules of the liquid crystal material in the birefringent lens grating 40, the liquid crystal in the birefringent lens grating 40 would exhibit a short-axis refractive index $n_o = n_p$, so that the emergent light finally passing through the birefringent lens grating 40 directly exits from the birefringent lens grating 40, without changing the path of the light, thereby realizing 2D display.

Herein, whether the first polarization direction is parallel to the long-axis direction of the liquid crystal molecules or the short-axis direction of the liquid crystal molecules is related to whether the liquid crystal molecules are optically positive light liquid crystal or optically negative light liquid crystal, but one of the first polarization direction and the second polarization direction is always parallel to the long-axis of the liquid crystal molecules and the other is always parallel to the short-axis of the liquid crystal molecules.

Fifthly, in the embodiments of the present disclosure, each pixel region 01 may emit collimated light of a first polarization direction at a certain moment, and may emit collimated light of a second polarization direction at another moment, but it will not simultaneously emit the collimated light of the first polarization direction and the collimated light of the second polarization direction. Therefore, the feature that the birefringent lens grating 40 is configured to transmit collimated light of a first polarization direction emitted from each of the pixel regions 01 along an original optical path of the collimated light means that, when a certain pixel region 01 emits collimated light of the first polarization direction, the birefringent lens grating 40 does not change the optical path of the emergent light, and the emergent light is emitted out perpendicularly from the birefringent lens grating 40, as shown by the light rays on the right side in FIG. 1. The feature that the birefringent lens grating 40 is configured to refract collimated light of a second polarization direction emitted from each of the pixel regions 01 to a field of view corresponding to the pixel region 01 means that, when a certain pixel region 01 emits collimated light of the second polarization direction, the birefringent lens grating 40 refracts the emergent light to change the optical path of the emergent light, so that the emergent light is refracted to a field of view corresponding to the pixel region 01, as shown by the light rays on the left side in FIG. 1. Apparently, the above two phenomena would not appear in one and the same pixel region 01 at the same time.

That is to say, the display assembly provided by the embodiments of the present disclosure may only perform a 2D display or may only perform a stereoscopic display during the display process, or may perform a 2D display in some partial regions and a stereoscopic display in some other partial regions. The stereoscopic display may be a 3D (3 Dimension) display, a 4D (4 Dimension) display, or the like. In order to achieve nD (n Dimension) display, it is necessary to have n−1 viewpoints, and the grating pitch of the cylindrical lens concave grating should correspond to the width of n−1 pixel regions 01.

In the display assembly provided by the embodiments of the present disclosure, by means of combining the polymer dispersed liquid crystal layer 10 with the birefringent lens grating 40, it allows the display assembly to realize both the 2D display and the stereoscopic display simultaneously, or the switch between 2D display and stereo display by controlling the polarization direction of the incident light during the display process.

Further, the display assembly according to the embodiments of the present disclosure does not change the polarization direction of the incident light, therefore it is not necessary to provide a polarizer or a liquid crystal layer, thereby the display assembly becomes light and thin.

In some embodiments, as shown in FIG. 1, the pixel regions 01 are divided into left eye pixel regions 01 and right eye pixel regions 01, and the birefringent lens grating 40 is configured to refract collimated light of the second polarization direction emitted from each of the left eye pixel regions 01 to a left eye field of view, and to refract collimated light of the second polarization direction emitted from each of the right eye pixel regions 01 to a right eye field of view.

Herein, if the incident light is all collimated light of the second polarization direction, the display assembly only performs a 3D display, and if the incident light further includes collimated light of the first polarization direction, it performs a 2D display at a region where the incident light is collimated light of the first polarization direction and performs a 3D display at a region where the incident light is collimated light of the second polarization direction.

In addition, the material of the cylindrical lens concave grating is a polymer, and the interface of the polymer is a curved surface. For the specific shape of the curved surface, it may be appropriately set in view of the size of the pixel regions 01, the number of stereoscopic viewpoints (how many dimensions to display), and the viewing distance. As shown in FIG. 1, in order to realize 3D display, the grating pitch of the cylindrical lens concave grating should correspond to the width of two pixel regions 01, and the grating pitch thereof may be slightly smaller than the width of two pixel regions 01. Each grating strip is a mirror symmetrical pattern, and the axis of symmetry thereof is parallel to the direction in which the grating strip extends.

Figure 3:
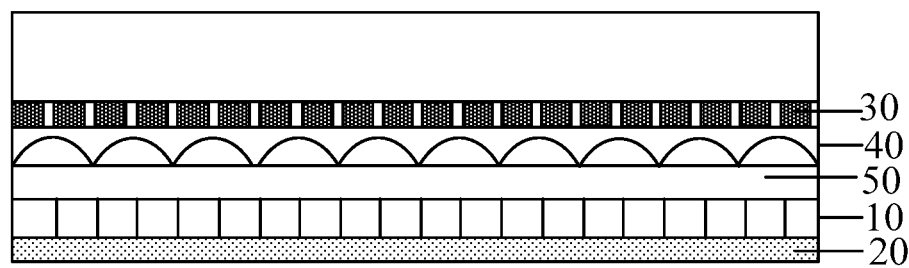
FIG. 3 is a schematic structural view of a display assembly according to another embodiment of the present disclosure.

In some embodiments, in order to increase the range of application of the display assembly, as shown in FIG. 3, the display assembly further includes a transparent intermediate layer 50 disposed between the polymer dispersed liquid crystal layer 10 and the birefringent lens grating 40.

The intermediate layer 50 may be, for example, a transparent film or glass, or the like. The thickness of the intermediate layer 50 is related to the viewing distance, and therefore may be appropriately set according to the viewing distance.

In some embodiments, as shown in FIG. 3, the viewing distance of the display assembly is relatively small, therefore the distance between the polymer dispersed liquid crystal layer 10 and the birefringent lens grating 40 is small. In this case, the intermediate layer 50 is a transparent film, the second electrode layer 30 cannot be disposed therebetween. Therefore, the first electrode layer 20 is disposed on a side of the polymer dispersed liquid crystal layer 10 away from the birefringent lens grating 40, and the second electrode layer 30 is disposed on a side of the birefringent lens grating 40 away from the polymer dispersed liquid crystal layer 10.

In some embodiments, the viewing distance of the display assembly is relatively large, therefore the distance between the polymer dispersed liquid crystal layer 10 and the birefringent lens grating 40 is large. In this case, the intermediate layer 50 is made of glass, then the second electrode layer 30 may be disposed between the polymer dispersed liquid crystal layer 10 and the birefringent lens grating 40, and the first electrode layer 20 is disposed on a side of the polymer dispersed liquid crystal layer 10 away from the birefringent lens grating 40.

Figure 4:
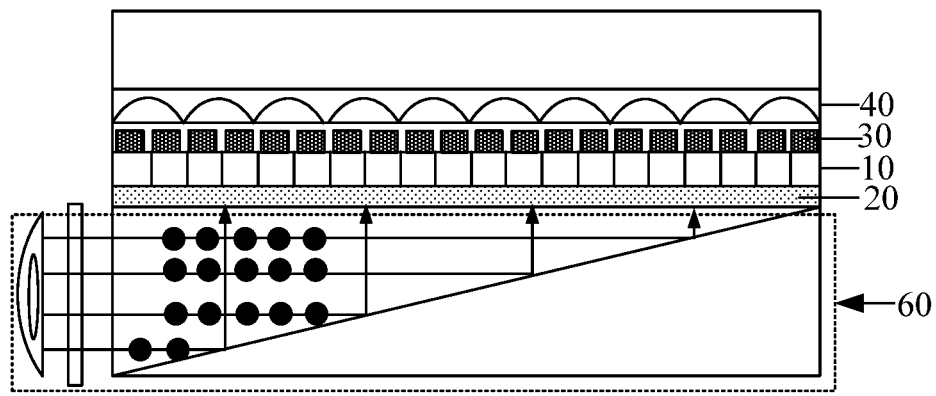
FIG. 4 is a schematic structural view of a display device according to an embodiment of the present disclosure.
Figure 5:
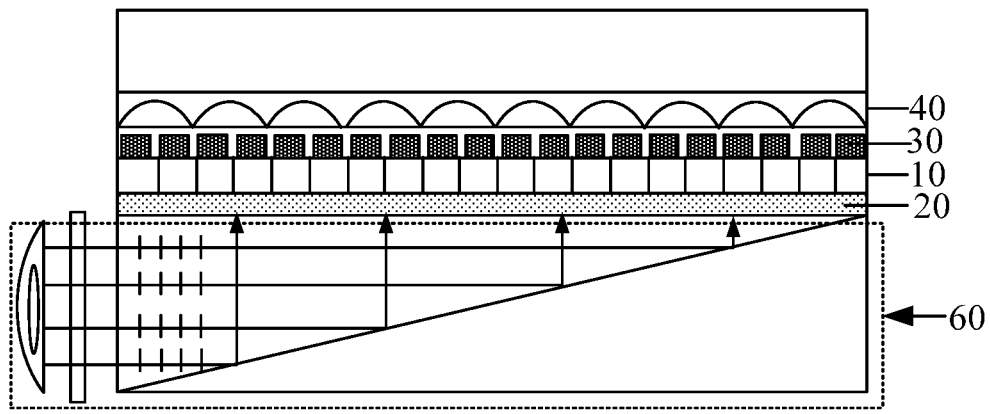
FIG. 5 is a schematic structural view of a display device according to another embodiment of the present disclosure.
Figure 6:
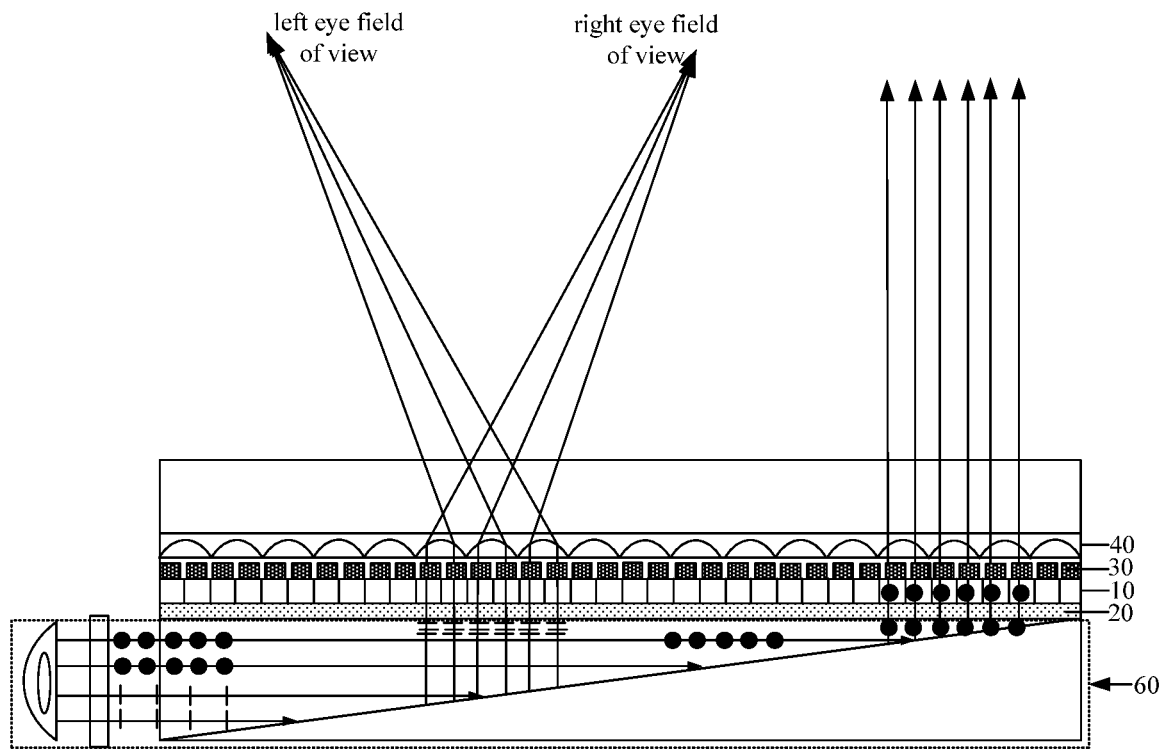
FIG. 6 is a schematic structural view of a display device according to a further embodiment of the present disclosure.

In some embodiments of the present disclosure, it further provides a display device, including the above display assembly and a backlight module 60. As shown in FIG. 4, the backlight module 60 provides only the collimated light of the first polarization direction to the display assembly; or alternatively, as shown in FIG. 5, the backlight module 60 provides only the collimated light of the second polarization direction to the display assembly; or alternatively, as shown in FIG. 6, the backlight module 60 provides the collimated light of the first polarization direction to some partial regions of the display assembly, and provides the collimated light of the second polarization direction to some other partial regions of the display assembly.

It should be noted that the specific structure of the backlight module 60 is not limited, as long as it can provide the collimated light of the first polarization direction and the collimated light of the second polarization direction to the display assembly. Herein, the collimated light means that the light is emitted from the light guide plate 63 to the display assembly by an incident angle of 0°, the backlight module 60 shown in FIGS. 4 to 6 is merely illustrative and it should not be limited thereto.

In the display device provided by the embodiments of the present disclosure, it provides the display device with 2D display and stereoscopic display by means of the backlight module 60 providing the collimated light of the first polarization direction and the collimated light of the second polarization direction to the display assembly. It is not necessary to provide a polarizer or a liquid crystal layer in the display assembly, so that the uniformity of brightness of the display device is high, and the thickness of the display device is small.

Figure 7:
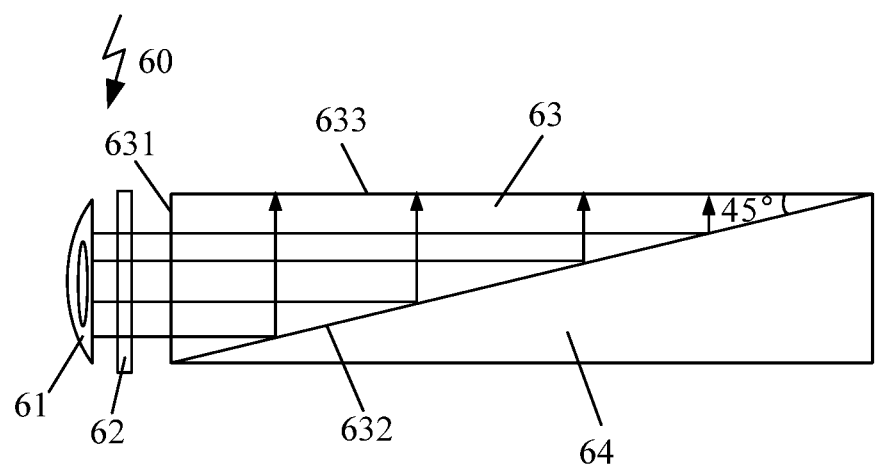
FIG. 7 is a schematic structural view of a backlight module according to an embodiment of the present disclosure.

In some embodiments, as shown in FIG. 7, the backlight module 60 includes a light source 61, a polarization controller 62 disposed on a light exit side of the light source 61, and a light guide plate 63. The polarization controller 62 is configured to make the light emitted into the light guide plate 63 be light of the first polarization direction or light of the second polarization direction; the light guide plate 63 is configured to allow the light of the first polarization direction and the light of the second polarization direction to be emitted perpendicularly into the display assembly.

The incident angle of the light emitted from the light source 61 and the shape of the light guide plate 63 are not limited, as long as the light guide plate 63 can directly transmit the light emitted from the light source 61 perpendicularly into the display assembly. The structure of the backlight module 60 shown in FIG. 7 is only illustrative. In the example of FIG. 7, the light guide plate 63 includes a light incident surface (a side surface 631) opposite to the light source 61, a light exit surface (a bottom surface 633) parallel to the display assembly, and a reflective surface (a slope surface 632) intersecting with the light incident surface and the light exit surface.

Further, the polarization controller 62 can convert the light emitted from the light source 61 into two polarized lights perpendicular to each other. Of course, the light of the first polarization direction and the light of the second polarization direction may exist simultaneously in different regions, or may exist in a time-sharing manner.

In the backlight module 60 provided by the embodiments of the present disclosure, the light emitted from the light source 61 is converted into two polarized lights whose polarization directions are perpendicular to each other, by using the polarization controller 62. On the one hand, the technology of the polarization controller 62 is well developed and the structure thereof is simple, on the other hand, the polarization controller 62 may be disposed on the side surface of the light guide plate 63, which may reduce the thickness of the backlight module 60.

In some embodiments, as shown in FIG. 7, the backlight module 60 further includes a support plate 64. The support plate 64 and the light guide plate 63 are wedge-shaped bodies of the same shape, and the slope surface 632 of the light guide plate and a slope surface of the support plate 64 contact with each other to form a cuboid. The parallel light emitted from the light source 61 is emitted into the rectangular side surface 631 of the light guide plate 63, and reflected by the slope surface 632 of the light guide plate, and then emitted out in a direction perpendicular to the rectangular bottom surface 633 of the light guide plate 63. The included angle between the slope surface 632 of the light guide plate and the rectangular bottom surface is 45°; the light exit direction of the light source 61 is perpendicular to the light exit direction of the light guide plate 63.

That is to say, the support plate 64 and the light guide plate 63 are obtained by cutting a cuboid along a diagonal plane.

The rectangular side surface 631 of the light guide plate 63 may be perpendicular to the rectangular bottom surface thereof, the rectangular bottom surface is parallel to the backlight module 60, and the light source 61 and the polarization controller 62 are disposed on the side of the rectangular side surface 631 of the light guide plate. The parallel light emitted from the light source 61 is perpendicular to the rectangular side surface 631 of the light guide plate, and reflected by the slope surface 632 of the light guide plate, and then emitted out in a direction perpendicular to the rectangular bottom surface 633 of the light guide plate. Herein, the light may or may not be totally reflected on the slope surface 632 of the light guide plate, depending on the material of the light guide plate 63.

The included angle between the slope surface 632 of the light guide plate and the rectangular bottom surface 633 of the light guide plate is 45°, that is, the incident angle and the reflection angle of the light emitted from the light source 61 on the slope surface 632 of the light guide plate are both 45°.

The wedge-shaped body includes, for example, a rectangular bottom surface, a quadrangular slope surface, a rectangular side perpendicular to the rectangular bottom surface, and two triangular side surfaces, and the two triangular side surfaces are oppositely disposed.

In the embodiments of the present disclosure, the light guide plate 63 is constructed as having a wedge shape, so that the light can be reflected on the slope surface 632 of the light guide plate. The light source 61 emits collimated parallel light, and it is reflected by the light guide plate 63 to form collimated light perpendicular to the display assembly. The structure is simple and the cost is low. In order to enable the user to clearly watch the scene behind the display device, the backlight module 60 is additionally provided with a support plate 64 having the same structure as the light guide plate 63.

In some embodiments, in order to achieve color display, the light source 61 in the display device is configured to periodically emit a plurality of monochromatic lights in a predetermined sequence.

Herein, the predetermined sequence may be set when the display device is manufactured, or may be adjusted during use.

Exemplarily, the light source 61 can emit three kinds of monochromatic lights of red, green and blue, and the predetermined sequence is red, green to blue, then the light source 61 emits light according to the order of the red, green, blue, red, green, blue, red, green, to blue . . . during the light emission process.

In this way, the display device can realize color display without a color filter layer, which reduces the thickness of the display device and increases the transmittance of the display device.

Figure 8:
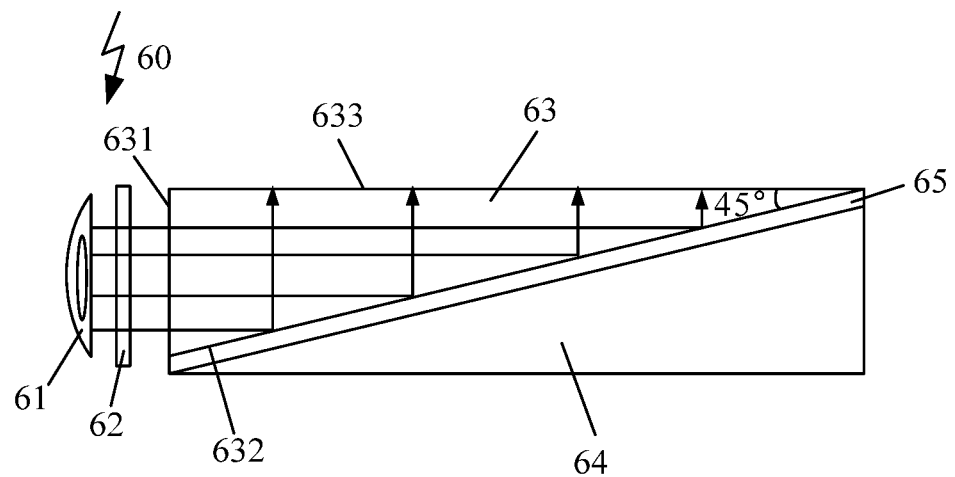
FIG. 8 is a schematic structural view of a backlight module according to another embodiment of the present disclosure.

In some embodiments, as shown in FIG. 8, the backlight module 60 further includes at least one transparent reflection-enhanced layer 65 disposed between the slope surface 632 of the light guide plate and the slope surface of the support plate 64. The transparent reflection-enhanced layer 65 is configured to reflect the light of the first polarization direction and the light of the second polarization direction, and to transmit light that is emitted from the support plate 64 to the transparent reflection-enhanced layer 65.

Herein, in order to reduce the cost of the selected light guide plate 63, a transparent reflection-enhanced layer 65 is added in the embodiment of the present disclosure, such that the light of the first polarization direction and the light of the second polarization direction are perpendicularly reflected to the display assembly through the transparent reflection-enhanced layer 65. Of course, it should be understood by those skilled in the art that the material of the transparent reflection-enhanced layer 65 should be selected in view of the reflective ability and the transmissive ability of the transparent reflection-enhanced layer 65, in order to realize transparent display.

Further, if the light guide plate 63 has no reflection ability to the light emitted from the light source 61, the process of reflection should be performed by the transparent reflection-enhanced layer 65, and therefore the transparent reflection-enhanced layer 65 should be able to reflect any kind of light emitted from the light source 61. Exemplarily, if the light source 61 emits three kinds of light of red, green, and blue, the transparent reflection-enhanced layer 65 should reflect all red light, green light and blue light. Apparently, if one transparent reflection-enhanced film cannot achieve the above effects, the transparent reflection-enhanced layer 65 may include a plurality of transparent reflection-enhanced films, and each transparent reflection-enhanced film can reflect at least one monochromatic light.

Figure 9:
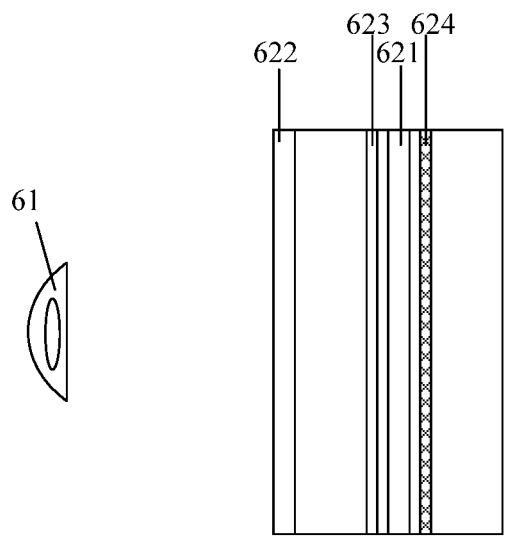
FIG. 9 is a schematic structural view of a polarization controller according to an embodiment of the present disclosure.
Figure 10:
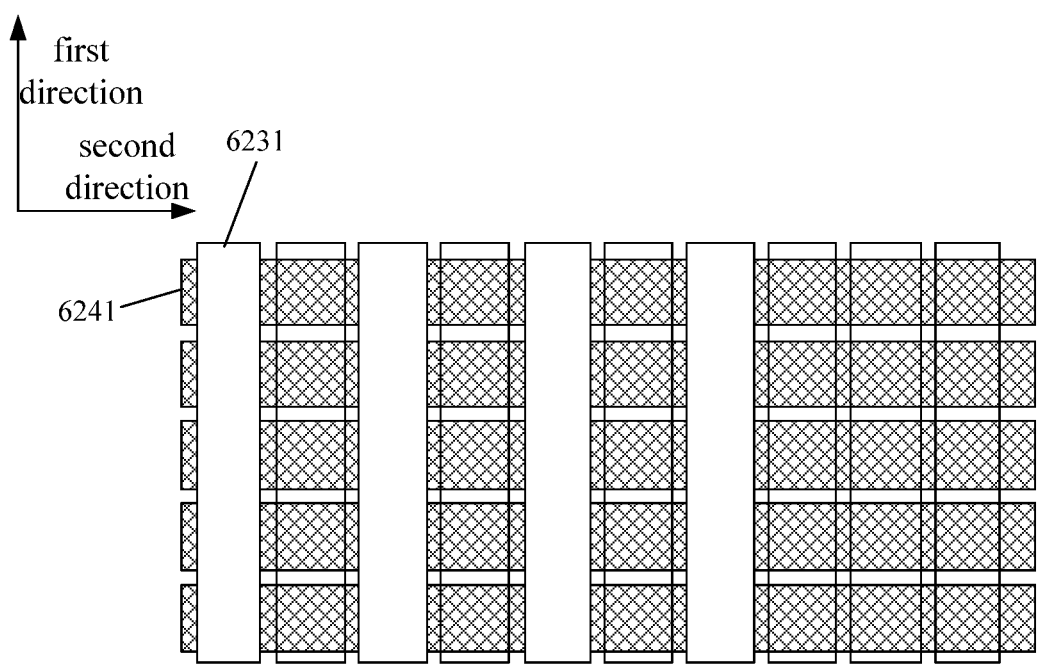
FIG. 10 is a schematic structural view of a third electrode layer and a fourth electrode layer according to an embodiment of the present disclosure.

In some embodiments, the liquid crystal layer 621 may be driven in a region division manner, therefore in order to reduce the control circuit, as shown in FIG. 9, the polarization controller 62 includes a liquid crystal layer 621 and a polarizer 622 disposed at a side of the liquid crystal layer 621 close to the light source 61. The polarization controller 62 further includes a third electrode layer 623 and a fourth electrode layer 624 for providing an electric field to the liquid crystal layer 621, as shown in FIG. 10, the third electrode layer 623 includes a plurality of first sub-electrodes 6231 spaced apart in a first direction, the fourth electrode layer 624 includes a plurality of second sub-electrodes 6241 spaced apart in a second direction, the second direction intersecting with the first direction;

In some embodiments, in order to control the liquid crystal layer 621 precisely, the liquid crystal layer 621 may be point-controlled by the third electrode layer 623 and the fourth electrode layer 624, and the third electrode layer 623 includes a plurality of first sub-electrodes 6231 arranged in a matrix, and the fourth electrode layer 624 is of a planar electrode.

That is to say, the structures of the third electrode layer 623 and the fourth electrode layer 624 are the same as those of the first electrode layer 20 and the second electrode layer 30 shown in FIG. 2.

For the above, the third electrode layer 623 may be disposed near the polarizer 622 or the fourth electrode layer 624 may be disposed near the polarizer 622, and FIG. 9 is only illustrative.

In order to simplify structure, the structure for driving the first electrode layer 20 and the second electrode layer 30 may be integrated with the structure for driving the third electrode layer 623 and the fourth electrode layer 624 on one and the same member.

In some embodiments of the present disclosure, it further provides a control method of the foregoing display device, wherein the control method includes:

S10: controlling the backlight module 60 to provide the collimated light of the first polarization direction and/or the collimated light of the second polarization direction to the display assembly;

According to the display requirements, it is possible that only the collimated light of the first polarization direction is provided, or only the collimated light of the second polarization direction is provided, or the collimated light of the first polarization direction is provided to one portion of the pixel regions 01 and the collimated light of the second polarization direction is provided to the other portion of the pixel regions 01.

S20: applying a voltage to the first electrode layer 20 and the second electrode layer 30 according to an image to be displayed such that sub-pixels in the polymer dispersed liquid crystal layer 10 that do not correspond to the image to be displayed are in a transparent state.

Herein, the polymer dispersed liquid crystal layer 10 is kept in a scattering state without being applied with a voltage, therefore when a voltage is applied to the sub-pixels that do not correspond to the image to be displayed so that they are in a transparent state, the image composed of the undriven pixel regions 01 would be the image to be displayed. This is different from the display principle of an ordinary liquid crystal display panel, therefore it is necessary to reversely convert the video.

Herein, after the state of the polymer dispersed liquid crystal layer 10 is well controlled, the collimated light of the first polarization direction and the collimated light of the second polarization direction are emitted to the birefringent lens grating 40 through the polymer dispersed liquid crystal layer 10, and the birefringent lens grating 40 transmits the collimated light of the first polarization direction emitted from each of the pixel regions 01 along the original optical path thereof, and refracts the collimated light of the second polarization direction emitted from each of the pixel regions 01 to a field of view corresponding to the pixel region 01.

The beneficial effects of the control method of the display device provided by the embodiments of the present disclosure are the same as those of the display device, and therefore will not be described herein again.

The above only refers to the specific embodiments of the present disclosure, but the scope of the present disclosure is not limited thereto. Any change or substitution made by those skilled in the art within the technical scope of the present disclosure should be fallen into the scope of the present disclosure. Therefore, the scope of the present disclosure should be determined by the claim set attached herein.

What is claimed is:

1. A display assembly, comprising:
 a polymer dispersed liquid crystal layer;
 a first electrode layer and a second electrode layer for providing an electric field for the polymer dispersed liquid crystal layer; and
 a birefringent lens grating that is closer to a display side of the display assembly than the polymer dispersed liquid crystal layer,
 wherein the birefringent lens grating is configured to transmit collimated light of a first polarization direction emitted from the polymer dispersed liquid crystal layer along an original optical path of the collimated light, and to refract collimated light of a second polarization direction emitted from the polymer dispersed liquid crystal layer to left and right eyes of a user, respectively;
 wherein the first polarization direction is perpendicular to the second polarization direction; and
 wherein:
  the first electrode layer comprises a plurality of block electrodes arranged in a matrix, and the second electrode layer is of a planar electrode; or
  wherein the first electrode layer is of a planar electrode, and the second electrode layer comprises a plurality of block electrodes arranged in a matrix.

2. The display assembly according to claim 1, wherein the display assembly comprises a plurality of pixel regions, the plurality of pixel regions being divided into left eye pixel regions and right eye pixel regions; and
 wherein the birefringent lens grating is configured to refract collimated light of the second polarization direction emitted from each of the left eye pixel regions to a left eye field of view, and to refract collimated light of the second polarization direction emitted from each of the right eye pixel regions to a right eye field of view.

3. The display assembly according to claim 2, wherein in a row direction or a column direction, the pixel region adjacent to one left eye pixel region is a right eye pixel region, and the pixel region adjacent to one right eye pixel region is a left eye pixel region.

4. The display assembly according to claim 2, wherein a projection of the first electrode layer on the polymer dispersed liquid crystal layer and a projection of the second electrode layer on the polymer dispersed liquid crystal layer overlap to form a plurality of overlapping regions, the plurality of overlapping regions being in one-to-one correspondence with the plurality of pixel regions.

5. The display assembly according to claim 1, wherein the first electrode layer is disposed on a side of the polymer dispersed liquid crystal layer away from the birefringent lens grating; and
 wherein the second electrode layer is disposed on a side of the birefringent lens grating away from the polymer dispersed liquid crystal layer or between the polymer dispersed liquid crystal layer and the birefringent lens grating.

6. The display assembly according to claim 1, further comprising a transparent intermediate layer disposed between the polymer dispersed liquid crystal layer and the birefringent lens grating.

7. The display assembly according to claim 2, wherein the birefringent lens grating is a cylindrical lens concave grating.

8. The display assembly according to claim 7, wherein the cylindrical lens concave grating has a grating pitch corresponding to a width of two pixel regions.

9. A display device, comprising:
the display assembly according to claim 1; and
a backlight module,
wherein the backlight module is configured to provide the collimated light of the first polarization direction and the collimated light of the second polarization direction to the display assembly.

10. The display device according to claim 9, wherein:
the backlight module comprises a light source, a polarization controller disposed on a light exit side of the light source, and a light guide plate;
the polarization controller is configured to make light emitted into the light guide plate be light of the first polarization direction or light of the second polarization direction; and
the light guide plate is configured to allow the light of the first polarization direction and the light of the second polarization direction to be emitted perpendicularly into the display assembly.

11. The display device according to claim 10, wherein the light guide plate is a wedge-shaped body and comprises a light incident surface opposite to the light source, a light exit surface parallel to the display assembly, and a reflective surface intersecting with the light incident surface and the light exit surface.

12. The display device according to claim 11, wherein the backlight module further comprises a support plate, the support plate being a wedge-shaped body having a same shape as the light guide plate, and a slope surface of the light guide plate and a slope surface of the support plate contact with each other to form a cuboid.

13. The display device according to claim 11, wherein the light guide plate has an included angle between the reflective surface of the light guide plate and the light exit surface of the light guide plate that is equal to 45°.

14. The display device according to claim 12, wherein the backlight module further comprises at least one transparent reflection-enhanced layer disposed between the slope surface of the light guide plate and the slope surface of the support plate, the transparent reflection-enhanced layer is configured to reflect the light of the first polarization direction and the light of the second polarization direction, and to transmit light that is emitted from the support plate to the transparent reflection-enhanced layer.

15. The display device according to claim 10, wherein the polarization controller comprises:
a liquid crystal layer;
a polarizer disposed on a side of the liquid crystal layer adjacent to the light source; and
a third electrode layer and a fourth electrode layer for providing an electric field to the liquid crystal layer.

16. The display device according to claim 15,
wherein the third electrode layer comprises a plurality of first sub-electrodes spaced apart in a first direction, and the fourth electrode layer comprises a plurality of second sub-electrodes spaced apart in a second direction, the second direction intersecting with the first direction; or
wherein the third electrode layer comprises a plurality of first sub-electrodes arranged in a matrix, and the fourth electrode layer is of a planar electrode.

17. The display device according to claim 10, wherein the light source is configured to periodically emit a plurality of monochromatic lights in a predetermined sequence.

18. A control method of controlling the display device according to claim 9, comprising:
controlling the backlight module to provide the collimated light of the first polarization direction and/or the collimated light of the second polarization direction to the display assembly; and
applying a voltage to the first electrode layer and the second electrode layer according to an image to be displayed such that sub-pixels in the polymer dispersed liquid crystal layer that do not correspond to the image to be displayed are in a transparent state.

19. The display assembly according to claim 1, wherein the display assembly comprises a plurality of pixel regions, the plurality of pixel regions being divided into left eye pixel regions and right eye pixel regions;
wherein the birefringent lens grating is configured to refract collimated light of the second polarization direction emitted from each of the left eye pixel regions to a left eye field of view, and to refract collimated light of the second polarization direction emitted from each of the right eye pixel regions to a right eye field of view;
wherein the display assembly further comprises a transparent intermediate layer disposed between the polymer dispersed liquid crystal layer and the birefringent lens grating; and
wherein the birefringent lens grating is a cylindrical lens concave grating.

* * * * *